(12) United States Patent
Maeda et al.

(10) Patent No.: US 11,610,743 B2
(45) Date of Patent: Mar. 21, 2023

(54) ENERGY STORAGE DEVICE

(71) Applicant: GS Yuasa International Ltd., Kyoto (JP)

(72) Inventors: Kazuto Maeda, Kyoto (JP); Shohei Yamao, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 249 days.

(21) Appl. No.: 16/647,424

(22) PCT Filed: Sep. 14, 2018

(86) PCT No.: PCT/JP2018/034087
§ 371 (c)(1),
(2) Date: Mar. 13, 2020

(87) PCT Pub. No.: WO2019/059108
PCT Pub. Date: Mar. 28, 2019

(65) Prior Publication Data
US 2020/0273635 A1    Aug. 27, 2020

(30) Foreign Application Priority Data

Sep. 22, 2017    (JP) .............................. JP2017-182920

(51) Int. Cl.
*H01G 11/80*    (2013.01)
*H01M 50/543*    (2021.01)
(52) U.S. Cl.
CPC .......... *H01G 11/80* (2013.01); *H01M 50/543* (2021.01)

(58) Field of Classification Search
CPC ........ H01G 11/74; H01G 11/80; H01G 11/82; H01M 50/15; H01M 50/172; H01M 50/528; H01M 50/543
See application file for complete search history.

(56) References Cited

U.S. PATENT DOCUMENTS

2010/0233529 A1*   9/2010   Nansaka ............. H01M 50/183
                                                                 429/181
2014/0349152 A1   11/2014   Guen et al.
(Continued)

FOREIGN PATENT DOCUMENTS

JP    2003-115286 A    4/2003
JP    2011-023235 A    2/2011
(Continued)

OTHER PUBLICATIONS

Ito et al., WO 2017/115859 A1; Wipo.int machine translation (Year: 2017).*

(Continued)

*Primary Examiner* — Adam A Arciero
(74) *Attorney, Agent, or Firm* — McGinn I.P. Law Group, PLLC

(57) ABSTRACT

An energy storage device includes an electrode terminal including a plate-like terminal body and a shaft portion connected to the terminal body, and an upper insulating member disposed between the terminal body and the case, the upper insulating member having a through-hole through which the shaft portion penetrates. The upper insulating member has a sidewall portion disposed along an end surface of the terminal body. The sidewall portion is provided with a thin portion at a position on a side of a center point of the shaft portion in a direction orthogonal to an extending direction of the sidewall portion in a plan view.

10 Claims, 6 Drawing Sheets

(56) References Cited

U.S. PATENT DOCUMENTS

2016/0260959 A1   9/2016  Guen
2018/0097208 A1   4/2018  Maeda et al.

FOREIGN PATENT DOCUMENTS

| JP | 2013-033661 A | 2/2013 |
| JP | 2014-154291 A | 8/2014 |
| JP | 2014-229606 A | 12/2014 |
| JP | 2015-035304 A | 2/2015 |
| JP | 2016-103447 A | 6/2016 |
| JP | 2016-122523 A | 7/2016 |
| JP | 2017-195164 A | 10/2017 |
| JP | 2018-056061 A | 4/2018 |
| JP | WO2017/115859 A1 | 10/2018 |
| WO | WO-2017115859 A1 * | 7/2017 |

OTHER PUBLICATIONS

International Search Report (ISR) (PCT Form PCT/ISA/210), in PCT/JP2018/034087, dated Oct. 16, 2018.

* cited by examiner

ENERGY STORAGE DEVICE

TECHNICAL FIELD

The present invention relates to an energy storage device including an insulating member disposed between a terminal body of an electrode terminal and a case.

BACKGROUND ART

Conventionally, an energy storage device including a case that houses an electrode assembly and an electrode terminal arranged in the case has been widely known. Patent Document 1 discloses a terminal structure used for an energy storage apparatus including a case that houses an electrode. In this terminal structure, an insulating member is disposed between the inner surface of the lid member and the base portion of the terminal member, and an insulating member is disposed between the outer surface of the lid member and a fixing member that fixes the terminal member to the lid member. At least one of the two insulating members is formed so that an outer portion positioned on the outer edge portion side of the lid member that is a welding position between the lid member and the case is relatively thinner than the inner portion thereof. Due to this, the outer portion is separated from the lid member. As a result, melting of the insulating member made of the resin material is suppressed by heat at the time of welding the lid member and the case.

PRIOR ART DOCUMENT

Patent Document

Patent Document 1: JP-A-2015-35304

SUMMARY OF THE INVENTION

Problems to be Solved by the Invention

Since the insulating member is generally formed of a non-metal such as a resin material as disclosed in Patent Document 1, there is a problem of how to protect the insulating member from heat during welding. In addition to insulation between the electrode terminal and the case, the insulating member carries the function of a rotation stopper or position regulation in a plan view (when the case body is viewed from the side of the electrode terminal), and accordingly there is a problem of what mode the electrode terminal to be held with.

As a result of examining how the insulating member should hold the electrode terminal, the inventors of the present invention have found that when the insulating member is formed so as to be in close contact with the electrode terminal for the purpose of position regulation of the electrode terminal, a problem due to the structure of the electrode terminal arises in the insulating member. Specifically, deformation may have occurred in the electrode terminal due to the joint method of the terminal body and the shaft portion, and in this case, deformation of the insulating member may occur. Furthermore, when a resin is contained in the material of the insulating member, whitening may occur in the insulating member. Deformation of the insulating member causes a problem of interference with another member disposed outside the case, and whitening of the insulating member also causes a shortening of the life of the energy storage device. Since the amount of deformation caused by due to the joint method of the terminal body and the shaft portion can be different for each electrode terminal, it is not easy to manufacture an insulating member that can correspond to each of the plurality of electrode terminals.

An object of the present invention is to provide a highly reliable energy storage device including an insulating member disposed between a terminal body of an electrode terminal and a case.

Means for Solving the Problems

The energy storage device according to a mode of the present invention is an energy storage device including: a case; an electrode terminal including a terminal body having a plate shape and a shaft portion connected to the terminal body; and an insulating member disposed between the terminal body and the case, the insulating member having a through-hole through which the shaft portion penetrates, wherein the insulating member has a sidewall portion disposed along an end surface of the terminal body, and the sidewall portion is provided with a thin portion or a notch portion at a position on a side of a center point of the shaft portion in a direction orthogonal to an extending direction of the sidewall portion in a plan view.

Advantages of the Invention

According to the present invention, it is possible to provide a highly reliable energy storage device including an insulating member disposed between a terminal body of an electrode terminal and a case.

MODE FOR CARRYING OUT THE INVENTION

Figure 1:
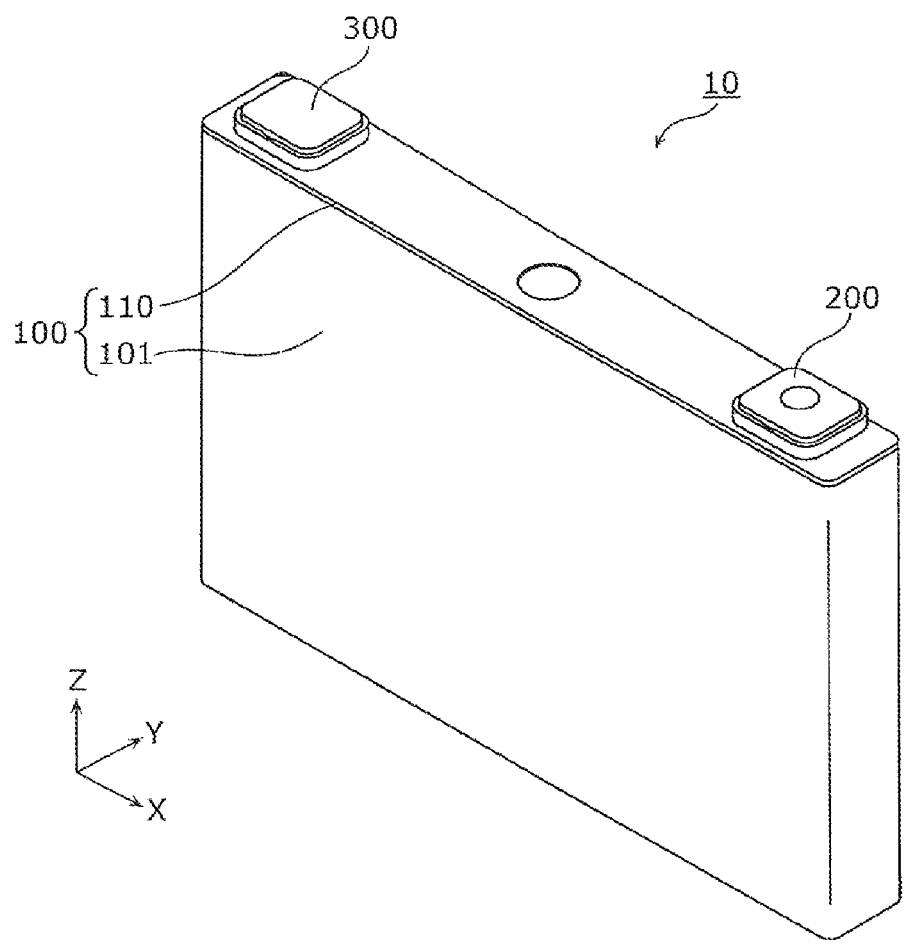
FIG. 1 is a perspective view illustrating an external appearance of an energy storage device according to an embodiment.

The energy storage device according to a mode of the present invention is an energy storage device including: a case; an electrode terminal including a terminal body having a plate shape and a shaft portion connected to the terminal body; and an insulating member disposed between the terminal body and the case, the insulating member having a through-hole through which the shaft portion penetrates, wherein the insulating member has a sidewall portion disposed along an end surface of the terminal body, and the sidewall portion is provided with a thin portion or a notch portion at a position on a side of a center point of the shaft portion in a direction orthogonal to an extending direction of the sidewall portion in a plan view.

According to this configuration, a thin portion or a notch portion exists at a position on the side of the shaft portion in the sidewall portion of the insulating member. Therefore, even when the width of the terminal body expands at the position of the shaft portion by a force applied to the shaft portion at the time of manufacturing the electrode terminal, the insulating member can easily accommodate the expansion portion of the terminal body by the thin portion or the notch portion. That is, in the insulating member of the present mode, the thin portion that is an easily deformed portion of the sidewall portion or the notch portion (portion where the sidewall portion does not exist) of the sidewall portion is disposed at a position corresponding to the expansion portion of the terminal body. Therefore, the insulating member according to the present mode can appropriately hold any of the plurality of electrode terminals when the expansion amount of the terminal body has individual differences for each electrode terminal. More specifically, at least the portion of the sidewall portion without the thin portion or the notch portion is disposed at a position along the end surface of the terminal body, so that the electrode terminal (terminal body) can carry the function of a rotation stopper or a position regulation. That is, the insulating member according to the present mode can perform the position regulation of the terminal body while allowing an expansion of the side of the shaft portion of the terminal body. Accordingly, the energy storage device according to the present mode is a highly reliable energy storage device including the insulating member disposed between the terminal body of the electrode terminal and the case.

The shaft portion may be plastically joined to the terminal body.

The energy storage device according to the present mode is prone to have expansion of the terminal body and tends to cause variations in the expansion amount, meanwhile an electrode terminal manufactured by using a plastic joint (joint using plastic deformation of at least one of two members) that easily gives high joint strength can be adopted. Therefore, the reliability of the joint between the shaft portion and the terminal body is high, and this contributes to the improvement in the reliability of the energy storage device.

The thin portion may be formed along an arc centered at the shaft portion.

According to this configuration, the sidewall portion is provided with the thin portion having a shape similar to the shape of the expansion portion of the terminal body. This allows a gap between the thin portion and the expansion portion of the terminal body to be reduced, resulting in reduction in the possibility of foreign matters entering and staying in the gap. This contributes to the improvement in the reliability of the energy storage device.

In a plan view, the thin portion or the notch portion may be disposed in the insulating member at positions opposed to each other in a first direction, and may be disposed in the insulating member at a center portion in a second direction orthogonal to the first direction.

According to this configuration, since the insulating member is formed in a 180° rotationally symmetrical shape, there are at least two options for the orientation of the insulating member in the arrangement process of arranging the insulating member on the lid plate, and there is no problem in either of the two options, resulting in improvement in the efficiency of the arrangement process, reduction in the possibility of erroneous arrangement of the insulating member, or the like. That is, it is possible to efficiently manufacture a highly reliable energy storage device.

In a plan view, the thin portion or the notch portion may be disposed in the insulating member at positions opposed to each other in a first direction, and may be disposed in the insulating member at positions opposed to each other in a second direction orthogonal to the first direction.

According to this configuration, even in the case where expansion occurs on the four sides of the electrode terminal provided with the shaft portion at the center of the terminal body having a substantially square shape in a plan view, the insulating member can easily accommodate the expansion of each side. That is, a highly reliable energy storage device can be obtained even when a substantially square terminal body is adopted to meet the specifications required for the energy storage device.

In a plan view, the terminal body may have, on each side of the shaft portion, a joint surface portion to which an external conductive member is joined.

According to this configuration, since the joint surface portion exists on each side of a mechanically fixed portion of the terminal body, the joint surface area with a bus bar and the like becomes relatively large. Furthermore, since a conductive member such as a bus bar can be joined to the terminal body in a balanced manner, the terminal body can be stabilized.

The insulating member may have a convex part formed on a bottom surface portion positioned between the case and the terminal body, the convex part positioned in the vicinity of the thin portion or the notch portion.

According to this configuration, the expansion portion of the terminal body can be supported from below (from the side of the case) by the convex part. Therefore, when a pressing force is applied to the terminal body at the time of welding the bus bar to the terminal body, deflection of the expansion portion of the terminal body can be suppressed. As a result, deformation of the terminal body is suppressed, thereby contributing to the improvement in the reliability of the energy storage device.

The insulating member may further have a concave part formed at a position on the back side of the convex part in the bottom surface portion.

The insulating member manufactured by resin molding is prone to deform due to shrinkage or the like when the thickness is not uniform. In this regard, in the insulating member of the present mode, a concave part is formed on the back side of the convex part in the bottom surface portion. That is, since the convex part is provided in such a mode that the thickness of the bottom surface portion is not largely changed, the insulating member is manufactured with high accuracy. This contributes to the improvement in the reliability of the energy storage device.

The energy storage device according to an embodiment and a variation of the present invention will be described below with reference to the drawings. It should be noted that each drawing is a schematic view, and is not necessarily illustrated strictly.

Each of the embodiments and variations described below represents a specific example of the present invention. The shapes, materials, components, arrangement positions and connection forms of components, order of manufacturing process, and the like illustrated in the following embodiments and variations are examples, and are not intended to limit the present invention. Among the components in the following embodiments and variations, components that are not described in the independent claim presenting the highest concept are described as optional components.

Hereinafter, in the description and drawings of the embodiments and variations, the alignment direction of a pair of electrode terminals included in the energy storage device, the alignment direction of a pair of current collectors, the alignment direction of both end portions (pair of mixture layer non-forming portions) of an electrode assembly, the winding axis direction of the electrode assembly, or the opposite direction of a short side surface of the case is defined as an X-axis direction. The opposite direction of a long side surface of the case, the short direction of the short side surface of the case, or the thickness direction of the case is defined as a Y-axis direction. The alignment direction of the case body of the energy storage device and the lid plate, the long direction of the short side surface of the case, the extending direction of the leg portion of the current collector, or the vertical direction is defined as a Z-axis direction. The X-axis direction, the Y-axis direction, and the Z-axis direction intersect (orthogonal in the present embodiment) one another. Although a case in which the Z-axis direction does not becomes the vertical direction may be considered depending on the usage mode, the Z-axis direction will be described as the vertical direction in the following description for the sake of convenience. In the following description, the X-axis direction positive side indicates the arrow direction side of the X-axis, and the X-axis direction negative side indicates the side opposite to the X-axis direction positive side. The same applies to the Y-axis direction and the Z-axis direction.

Embodiment

[1. General Description of Energy Storage Device]

Figure 2:
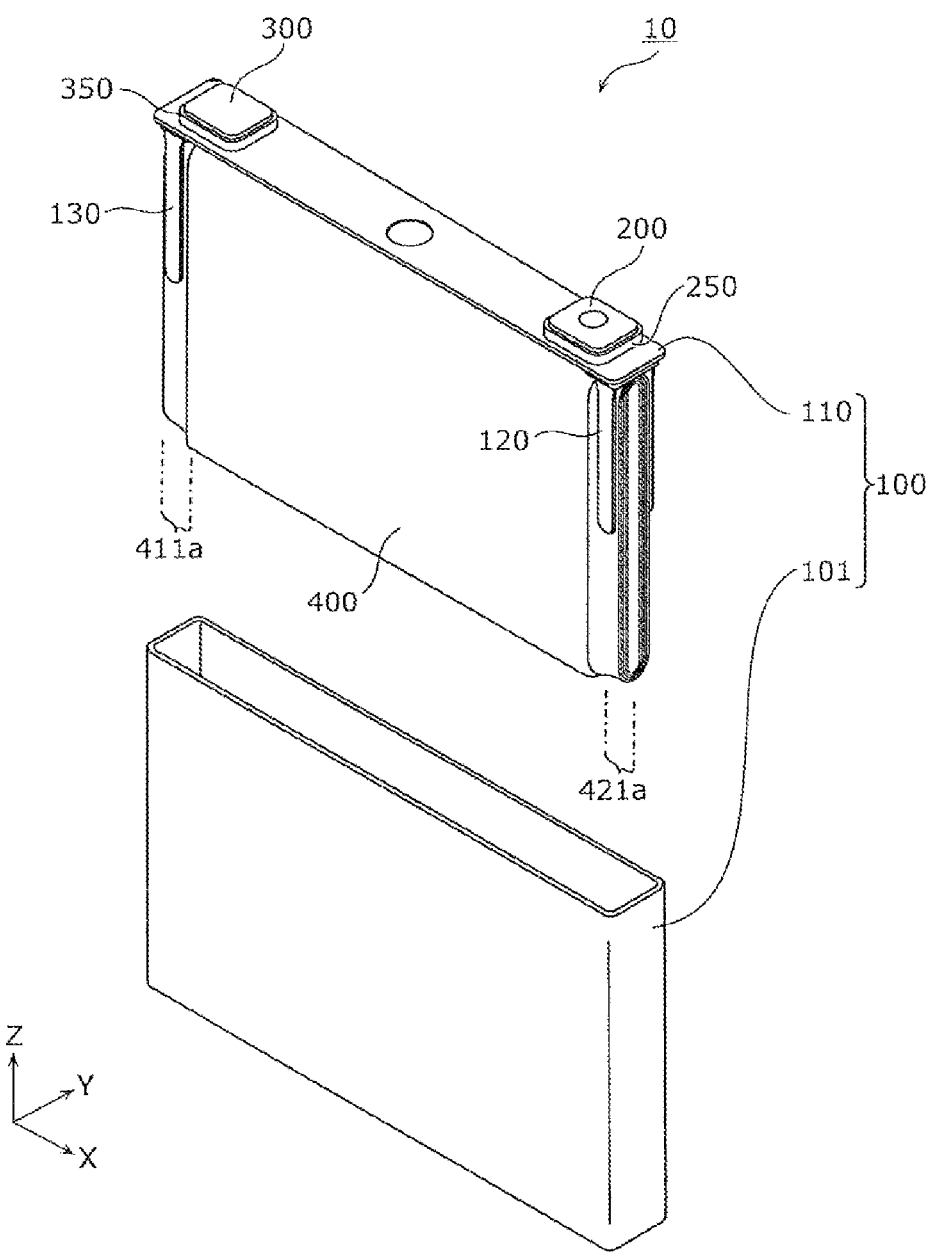
FIG. 2 is a perspective view illustrating components arranged in the case of the energy storage device according to the embodiment.

First, a general description on an energy storage device 10 according to the embodiment will be given with reference to FIGS. 1 and 2. FIG. 1 is a perspective view illustrating an external appearance of the energy storage device 10 according to an embodiment. FIG. 2 is a perspective view illustrating components arranged in a case 100 of the energy storage device 10 according to the embodiment. Specifically, FIG. 2 is a perspective view illustrating the energy storage device 10 with a lid plate 110 and a case body 101 of the case 100 separated from each other.

The energy storage device 10 is a secondary battery capable of charging and discharging electricity, and more specifically, is a nonaqueous electrolyte secondary battery such as a lithium ion secondary battery. The energy storage device 10 is applied to various vehicles such as an EV, an HEV, and a PHEV. The energy storage device 10 is not limited to a nonaqueous electrolyte secondary battery, and may be a secondary battery other than the nonaqueous electrolyte secondary battery or may be a capacitor. The energy storage device 10 may be a primary battery that allows the user to use stored electricity without charging.

As illustrated in FIG. 1, the energy storage device 10 includes the case 100 and electrode terminals 200 and 300. As illustrated in FIG. 2, a current collector 120 on the negative electrode side, a current collector 130 on the positive electrode side, and an electrode assembly 400 are accommodated inside the case 100.

The energy storage device 10 may include, in addition to the components described above, a spacer disposed on the side of the current collectors 120 and 130 and an insulating film that encloses the electrode assembly 400 and the like. An electrolyte solution (nonaqueous electrolyte) or the like is sealed inside the case 100 of the energy storage device 10, but illustration thereof is omitted. As the electrolyte solution to be sealed in the case 100, there is no particular limitation on the type thereof unless the performance of the energy storage device 10 is impaired, and various types of them can be selected.

The case 100 is constituted by the bottomed case body 101 having a rectangular cylindrical shape, and the lid plate 110, which is a plate-like member that closes an opening of the case body 101. The case 100 has a structure in which the inside is sealed by welding or the like between the lid plate 110 and the case body 101 after the electrode assembly 400 or the like is accommodated inside thereof. The materials of the lid plate 110 and the case body 101 are not particularly limited, but are preferably weldable metals such as stainless steel, aluminum, or aluminum alloy.

The electrode assembly 400 is an energy storage element (power generating element) including a positive electrode plate, a negative electrode plate, and a separator, and capable of storing electricity. The positive electrode plate is a plate in which a mixture layer containing a positive active material is formed on a positive substrate layer that is a long strip-shaped current collecting foil made of aluminum, aluminum alloy, or the like. The negative electrode plate is a plate in which a mixture layer containing a negative active material is formed on a negative substrate layer that is a long strip-shaped current collecting foil made of copper, copper alloy, or the like. The separator is a microporous sheet made of resin or the like. The electrode assembly 400 is formed by arranging and winding a separator between the positive electrode plate and the negative electrode plate.

End portions that are joined with the current collector 120 and 130 are present at respective ends of the electrode assembly 400 in the winding axis direction (X-axis direction in the present embodiment). The end portions are formed by laminating a metal foil that serves as a substrate layer. Specifically, the electrode assembly 400 has a positive-electrode-side end portion 411a formed by laminating a substrate layer of the positive electrode plate on one end (end portion on the X-axis direction negative side in FIG. 2) in the winding axis direction. The electrode assembly 400 has a negative-electrode-side end portion 421a formed by laminating a substrate layer of the negative electrode plate on the other end (end portion on the X-axis direction positive side in FIG. 2) in the winding axis direction.

While in the present embodiment, an elongated circular shape is illustrated as the cross-sectional shape of the electrode assembly 400, the cross-sectional shape may be an elliptic shape, a circular shape, a polygonal shape, or the like. The shape of the electrode assembly 400 is not limited to a winding type, and may be a laminated type in which flat plates are laminated.

The electrode terminal 200, which is a negative electrode terminal, is electrically connected with the negative electrode of the electrode assembly 400 via the current collector 120. The electrode terminal 300, which is a positive electrode terminal, is electrically connected with the positive electrode of the electrode assembly 400 via the current collector 130. The electrode terminals 200 and 300 are attached, via upper insulating members 250 and 350 having insulation properties, to the lid plate 110 disposed above the electrode assembly 400.

The current collectors 120 and 130 are members having conductivity and rigidity, disposed between the electrode assembly 400 and the wall surface of the case 100, and electrically connected with the electrode terminals 200 and 300, respectively, and the negative electrode plate and the positive electrode plate, respectively, of the electrode assembly 400. Although the material of the current collector 130 is not limited, it is made of aluminum, an aluminum alloy, or the like, similarly to the positive-electrode substrate layer of the electrode assembly 400. Although the material of the current collector 120 is also not limited, it is made of copper, copper alloy, or the like, similarly to the negative-electrode substrate layer of the electrode assembly 400.

In the present embodiment, each of the current collectors 120 and 130 is joined with the electrode assembly 400 by ultrasonic joint. That is, the current collector 120 is joined with the negative-electrode-side end portion 421a of the electrode assembly 400 by ultrasonic joint. The current collector 130 is joined with the positive-electrode-side end portion 411a of the electrode assembly 400 by ultrasonic joint.

[2. Attachment Structure of Electrode Terminal to Case]

Next, an attachment structure of the electrode terminal to the lid plate 110 in the energy storage device 10 according to the present embodiment will be described with reference to FIGS. 3 to 6. In the present embodiment, the attachment structures of the electrode terminals 200 and 300 to the lid plate 110 are in common. Therefore, the attachment structure of the negative electrode terminal 200 to the lid plate 110 will be described below, and illustration and description of the attachment structure of the positive electrode terminal 300 to the lid plate 110 will be omitted.

Figure 3:
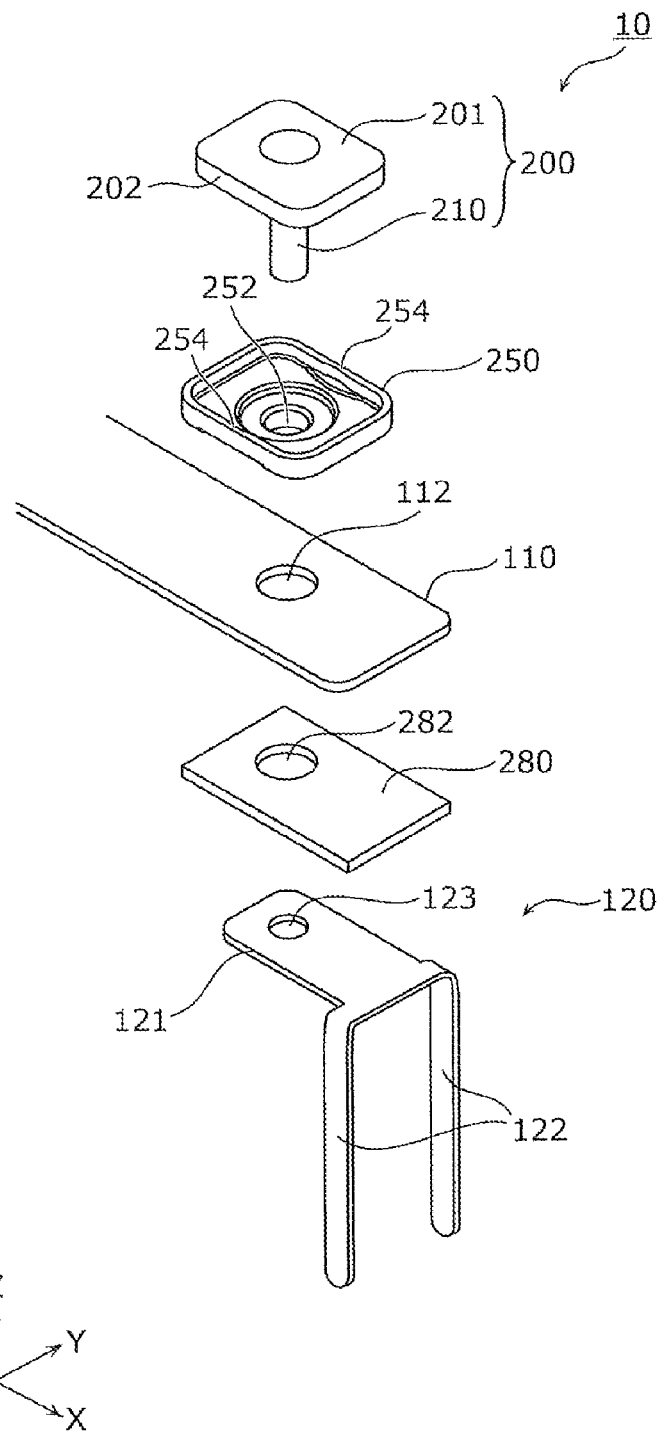
FIG. 3 is an exploded perspective view illustrating an attachment structure of an electrode terminal according to the embodiment to a lid plate.

FIG. 3 is an exploded perspective view illustrating the attachment structure of the electrode terminal 200 according to the embodiment to the lid plate 110. FIG. 3 illustrates a shaft portion 210 in a state before swaged, and does not illustrate an expansion (an expansion portion 201a illustrated in FIG. 4) of a terminal body 201.

Figure 4:
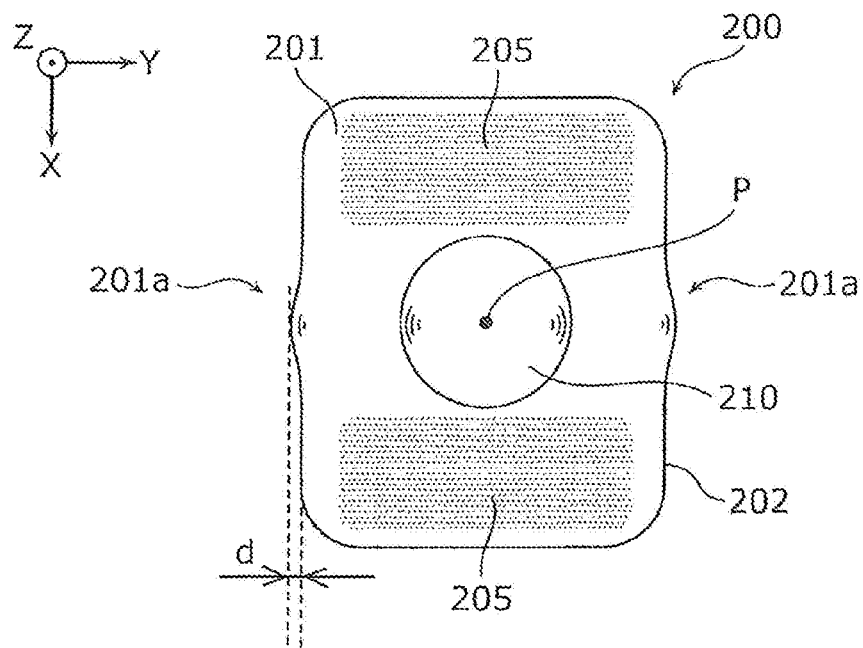
FIG. 4 is a plan view illustrating a configuration of the electrode terminal according to the embodiment.
Figure 5:
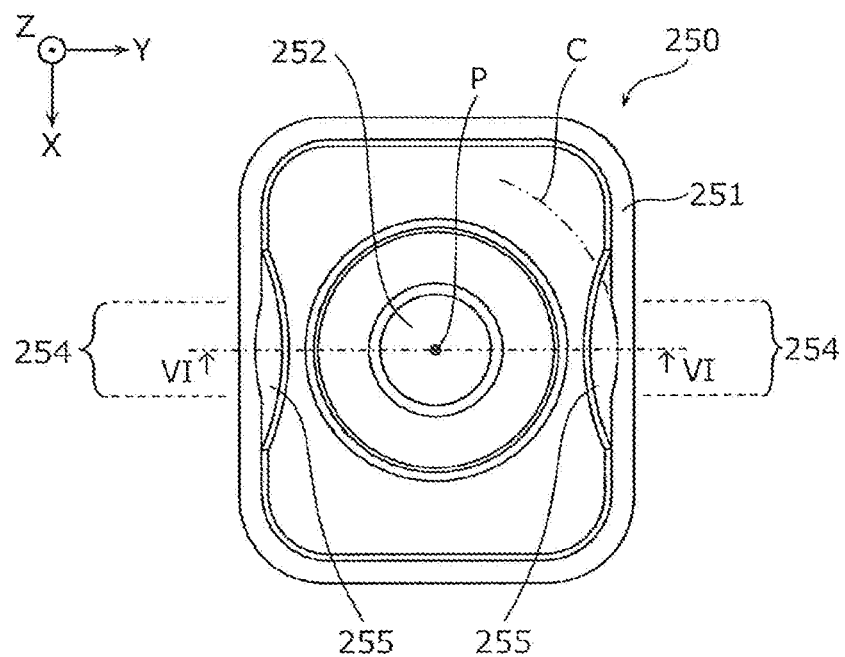
FIG. 5 is a plan view illustrating the configuration of an upper insulating member according to the embodiment.

FIG. 4 is a plan view illustrating the configuration outline of the electrode terminal 200 according to the embodiment, and FIG. 5 is a plan view illustrating the configuration outline of the upper insulating member 250 according to the embodiment. In FIG. 5, a center point (position of the axis center in a plan view) P of the shaft portion 210 (not illustrated in FIG. 5) is represented by a black circle. The same applies to FIG. 8 described later.

Figure 6:
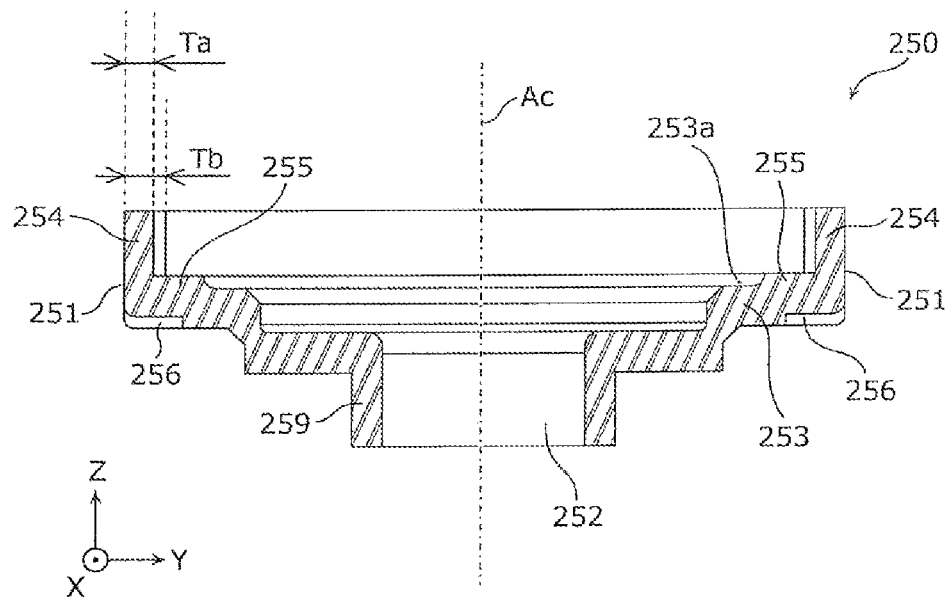
FIG. 6 is a cross-sectional view illustrating the configuration of the upper insulating member according to the embodiment.

FIG. 6 is a cross-sectional view illustrating the configuration outline of the upper insulating member 250 according to the embodiment. Specifically, FIG. 6 illustrates a cross section taken along a VI-VI line in FIG. 5. In FIG. 6, a center axis (virtual axis passing through the center point P and parallel to the axial direction) Ac of the shaft portion 210 (not illustrated in FIG. 6) is represented by a dash-dot-dash line. The same applies to FIG. 7 described later.

As illustrated in FIG. 3, in the present embodiment, the electrode terminal 200 has the terminal body 201 and the shaft portion 210. The terminal body 201 is disposed on the lid plate 110 of the case 100 via the upper insulating member 250, and is electrically connected with the current collector 120 in the case 100 via the shaft portion 210.

More specifically, the shaft portion 210 included in the electrode terminal 200 is inserted into a through-hole 252 of the upper insulating member 250, an opening portion 112 of the lid plate 110, an opening portion 282 of a lower insulating member 280, and an opening portion 123 of the current collector 120, and the tip end portion thereof is swaged. Due to this, the electrode terminal 200 is fixed to the lid plate 110 together with the upper insulating member 250, the lower insulating member 280, and the current collector 120.

The current collector 120 has a terminal connection portion 121 in which the opening portion 123 is formed and a pair of leg portions 122 extending from the terminal connection portion 121, and the pair of leg portions 122 are joined with the negative-electrode-side end portion 421a of the electrode assembly 400 as described above.

Thus, in the present embodiment, by swaging the tip end portion of the shaft portion 210 connected to the electrode terminal 200, the electrical and mechanical connection between the electrode terminal 200 and the current collector 120, and the fixation of these members, the upper insulating member 250, and the lower insulating member 280 to the case 100 (lid plate 110) are performed.

In the present embodiment, the upper insulating member 250, disposed between the lid plate 110 and the electrode terminal 200, has a cylindrical portion 259 forming the through-hole 252 through which the shaft portion 210 penetrates, and the cylindrical portion 259 has a role of maintaining airtightness between the shaft portion 210 and the opening portion 112 of the lid plate 110. That is, the upper insulating member 250 also has a role as a so-called gasket. Each of the upper insulating member 250 and the lower insulating member 280 is formed of an insulating material such as polycarbonate (PC), polypropylene (PP), polyethylene (PE), or polyphenylene sulfide resin (PPS).

In the present embodiment, the terminal body 201 is a member that inputs and outputs electric energy via the bus bar by being joined with the bus bar. Laser welding is used as a method for joining the terminal body 201 and the bus bar.

In the case where the bus bar and the terminal body 201 are joined using laser welding, these members are preferably made of aluminum or aluminum alloy from the viewpoints of corrosion prevention and weldability. On the other hand, since the current collector 120 on the negative electrode side is made of copper or copper alloy, the shaft portion 210, mechanically and electrically connected with the current collector 120, is preferably made of copper or copper alloy.

Accordingly, when the electrode terminal 200 is manufactured, joint of dissimilar metal (heterogeneous joint) between the terminal body 201 made of aluminum and the shaft portion 210 made of copper is needed. As a method of this heterogeneous joint, plastic joint (joint using plastic deformation), which is excellent in mass productivity and low in cost, is used in general. Examples of plastic joint include swaging joint by spin swaging and the like.

When the swaging joint is used as a method of joint between the shaft portion 210 and the terminal body 201, there is a case in which the shaft portion 210 inserted into the through-hole of the terminal body 201 is pressed in the axial direction and expands in the radial direction, and as a result, the terminal body 201 is deformed.

Specifically, as illustrated in FIG. 4, the expansion (expansion portion 201a) is generated at a position on the side of the shaft portion 210 of the terminal body 201. That is, the expansion portion 201a is formed at a position on the side of the shaft portion 210 of the terminal body 201 that has a rounded rectangular shape in a plan view. In the present embodiment, the center point P of the shaft portion 210 is positioned substantially at the center of the terminal body 210 in the long direction (X-axis direction) and substantially at the center of the terminal body 201 in the short direction (Y-axis direction) in a plan view. Therefore, in the terminal body 201, end surfaces 202 on the both sides in the short direction close to the shaft portion 210 expand outward, thereby forming the expansion portion 201a.

When the copper shaft portion 210 having a diameter of about 5 mm to 10 mm is joined by swaging joint to the aluminum terminal body 201 having a thickness of several mm and a length and a width of about several cm, an expansion amount d at the expansion portion 201a is about 0.1 mm to 1 mm. The smaller the thickness of the terminal body 201 is and the larger the ratio of the diameter of the shaft portion 210 to the vertical width or horizontal width of the terminal body 201 is, the larger the expansion amount d tends to be.

In this way, in the electrode terminal 200, the expansion portion 201a is formed in the terminal body 201 due to the manufacturing process. Unlike the case where the expansion portion 201a is shaped using a mold, an individual difference (variation) in the expanding amount d becomes relatively large in each of the plurality of terminal bodies 201. Accordingly, when the sidewall portion of the insulating member to which the terminal body 201 is attached is formed along the end surface 202 of the terminal body 201 before the joint with the shaft portion 210, the sidewall portion is pressed by the expansion portion 201a, and as a result, deformation of the insulating member and whitening of the resin insulating member can occur. Of course, it is technically possible to cut off the expansion portion 201a by cutting (trimming) the terminal body 201 where the expansion portion 201a has occurred. However, performing this trimming is difficult to adopt practically because of problems such as a decrease in the manufacturing efficiency of the energy storage device 10 and an increase in the production cost.

Therefore, in the upper insulating member 250 according to the present embodiment, as illustrated in FIGS. 3, 5, and 6, a thin portion 254 is provided at a part of a sidewall portion 251. This suppresses pressure on the sidewall portion 251 by the expansion portion 201a of the terminal body 201.

As described above, the energy storage device 10 according to the present embodiment includes: the electrode terminal 200 having the plate-like terminal body 201 and the shaft portion 210 connected to the terminal body 201; and the upper insulating member 250 disposed between the terminal body 201 and the case 100, the upper insulating member 250 in which the through-hole 252 through which the shaft portion 210 penetrates is formed. The upper insulating member 250 has the sidewall portion 251 disposed along the end surface 202 of the terminal body 201. The sidewall portion 251 is provided with the thin portion 254 at a position on the side of the center point P of the shaft portion 210 in a direction (Y-axis direction in the present embodiment) orthogonal to the extending direction (X-axis direction in the present embodiment) of the sidewall portion 251 in a plan view. In the present embodiment, as illustrated in FIG. 6, the thickness of the portion of the sidewall portion 251 other than the thin portion 254 (at least a portion adjacent to the thin portion 254) is Tb, and the thickness of the portion of the thin portion 254 having the smallest thickness is Ta (Ta<Tb).

According to this configuration, the upper insulating member 250 can easily accommodate the expansion portion (expansion portion 201a) of the terminal body 201 thanks to the thin portion 254. That is, in the upper insulating member 250 of the present mode, the thin portion 254, which is an easily deformed portion of the sidewall portion 251, is disposed at a position corresponding to the expansion portion 201a of the terminal body 201. Therefore, the upper insulating member 250 can appropriately hold any of the plurality of electrode terminals 200 in the case where the expansion amount d of the terminal body 201 has individual differences among the electrode terminals 200. More specifically, at least a portion of the sidewall portion 251 without the thin portion 254 is disposed at a position along the end surface 202 of the terminal body 201, so that the sidewall portion can carry the function of a rotation stopper or position regulation of the electrode terminal 200 (terminal body 201).

Of course, in consideration of the individual difference of the expansion amount d, it is also conceivable to configure an insulating member corresponding to each of the plurality of electrode terminals 200 by largely releasing outwardly the side portion of the shaft portion 210 in the sidewall portion. However, in this case, the size of the insulating member increases, and as a result, there is a possibility that the insulating member does not meet the specifications of the energy storage device 10 required to be miniaturized. For the electrode terminal 200 having a relatively small expansion amount d, a gap between the terminal body 201 and the sidewall portion becomes relatively large, and there may be a problem that foreign matters such as dust tend to accumulate in this gap.

In this regard, in the upper insulating member 250 according to the present embodiment, by providing the thin portion 254 at a position on the side of the shaft portion 210 in the sidewall portion, each of the electrode terminals 200 having a relatively large individual difference in the expansion amount d can be appropriately held without increasing the outer shape of the upper insulating member 250. Since trimming of the terminal body 201 after the joint with the shaft portion 210 is not required, this is advantageous from the viewpoint of manufacturing efficiency or production cost of the energy storage device 10.

Even if the expansion portion is not formed in the terminal body 201, the presence of the thin portion 254 does not interfere with the arrangement of the terminal body 201 onto the upper insulating member 250.

Accordingly, even when the problem of expansion does not exist in the electrode terminal 300 on the positive electrode side, a member having the identical shape to the upper insulating member 250 can be adopted as the upper insulating member 350. That is, the upper insulating member can be commonalized for both the positive electrode side and the negative electrode side.

As described above, the upper insulating member 250 according to the present embodiment can perform position regulation and the like of the terminal body 201 while allowing the lateral expansion of the shaft portion 210 of the terminal body 201. Accordingly, the energy storage device 10 according to the present embodiment is a highly reliable energy storage device including the upper insulating member 250 disposed between the terminal body 201 of the electrode terminal 200 and the case 100.

In the present embodiment, the shaft portion 210 is plastically joined to the terminal body 201.

In the energy storage device 10 according to the present embodiment, the upper insulating member 250 is provided with the thin portion 254, and it is hence possible to adopt the electrode terminal 200 manufactured using plastic joint (plastic joint that can give a high joint strength whereas expansion of the terminal body 201 is prone to occur and variation in the expansion amount d is prone to occur). Therefore, the reliability of the joint between the shaft portion 210 and the terminal body 201 is high, and this contributes to the improvement in the reliability of the energy storage device 10.

The plastic joint used for the joint between the shaft portion 210 and the terminal body 201 includes press-fitting in addition to the swaging joint. In this case, the end portion of the shaft portion 210 having an outer diameter larger than the inner diameter of a hole provided in the terminal body 201 is press-fitted into the hole, thereby joining the shaft portion 210 to the terminal body 201. As a result of this press-fitting, expansion may occur at a position on the side of the shaft portion 210 in the terminal body 201. Therefore, even when the shaft portion 210 and the terminal body 201 are joined by press-fitting, the upper insulating member 250 according to the present embodiment can appropriately hold the terminal body 201 while suppressing a problem such as whitening.

In the present embodiment, the thin portion 254 is formed along an arc centered at the shaft portion 210.

Specifically, in the present embodiment, as illustrated in FIG. 5, the sidewall portion 251 is provided with the thin portion 254 that forms an inner surface along an arc C centered at the center point P of the shaft portion 210.

That is, the sidewall portion 251 is provided with the thin portion 254 having a shape similar to the shape of the expansion portion 201a of the terminal body 201. This allows a gap between the thin portion 254 and the expansion portion 201a of the terminal body 201 to be reduced, resulting in reduction in the possibility of foreign matters entering and staying in the gap. This contributes to the improvement in the reliability of the energy storage device 10.

In the present embodiment, the thin portion 254 is disposed at the positions opposed to each other in the first direction (Y-axis direction in the present embodiment) of the upper insulating member 250 in a plan view. The thin portion 254 is disposed at a center portion of the upper insulating member 250 in the second direction (X-axis direction in the present embodiment) orthogonal to the first direction in a plan view.

That is, the upper insulating member 250 is formed in a 180° rotationally symmetrical shape centered at the center point P. For this reason, there are at least two options for the orientation of the upper insulating member 250 in the arrangement process of arranging the upper insulating member 250 on the lid plate 110, and there is no problem in either of the two options. As a result, the efficiency of the arrangement process is improved, the possibility of erroneous arrangement of the upper insulating member 250 is reduced, or the like. That is, it is possible to efficiently manufacture the highly reliable energy storage device 10.

In the present embodiment, in a plan view, the terminal body 201 has, on each side of the shaft portion 210, a joint surface portion 205 to which an external conductive member is joined. In FIG. 4, an approximate region of the joint surface portion 205 is illustrated as a dotted region.

In this configuration, the joint surface portion 205 exists on each side of the mechanically fixed portion (portion where the shaft portion 210 exists) of the terminal body 201. As a result, the joint area with a conductive member such as a bus bar becomes relatively large.

Furthermore, since the conductive member such as the bus bar can be joined to the terminal body 201 in a balanced manner, the terminal body 201 can be stabilized. Although in FIG. 5, the joint surface portion 205 exists only on the both sides in the long direction (X-axis direction) of the terminal body 201 with respect to the shaft portion 210, the joint surface portion 205 may be disposed on the both sides in the short direction (Y-axis direction) of the terminal body 201 in place of or in addition to the pair of joint surface portions 205.

In the present embodiment, as illustrated in FIG. 6, the upper insulating member 250 has a convex part 255 formed on a bottom surface portion 253 positioned between the case 100 and the terminal body 201, the convex part 255 positioned in the vicinity of the thin portion 254.

The bottom surface portion 253 is a portion of the upper insulating member 250 that forms a bottom surface 253a opposed to the back surface (surface on the Z-axis direction negative side) of the terminal body 201.

Thus, in the present embodiment, the convex part 255 protruding upward from the bottom surface 253a is provided in the vicinity of the thin portion 254. Due to this, the expansion portion 201a of the terminal body 201 can be supported from below (from the side of the case 100) by the convex part 255. Therefore, when a pressing force is applied to the terminal body 201 at the time of welding the bus bar to the terminal body 201, deflection of the expansion portion 201a of the terminal body 201 can be suppressed. As a result, deformation of the terminal body 201 is suppressed, thereby contributing to the improvement in the reliability of the energy storage device 10.

In the present embodiment, as illustrated in FIG. 6, the upper insulating member 250 further has a concave part 256 formed at a position on the back side of the convex part 255 in the bottom surface portion 253.

The upper insulating member 250 manufactured by resin molding is prone to deform due to shrinkage or the like when the thickness is not uniform. In this regard, in the upper insulating member 250 according to the present embodiment, the concave part 256 is formed on the back side of the convex part 255 in the bottom surface portion 253. That is, since the convex part 255 is provided in such a mode that the thickness of the bottom surface portion 253 is not largely changed, the upper insulating member 250 is manufactured with high accuracy. This contributes to the improvement in the reliability of the energy storage device 10.

Although the energy storage device 10 according to the embodiment has been described above, the energy storage device 10 may include the upper insulating member 250 in a mode different from that illustrated in FIGS. 3 to 6. Hereinafter, variations of the structure of the upper insulating member 250 in the energy storage device 10 will be described with a focus on differences from the above-described embodiment.

(Variation 1)

Figure 7:
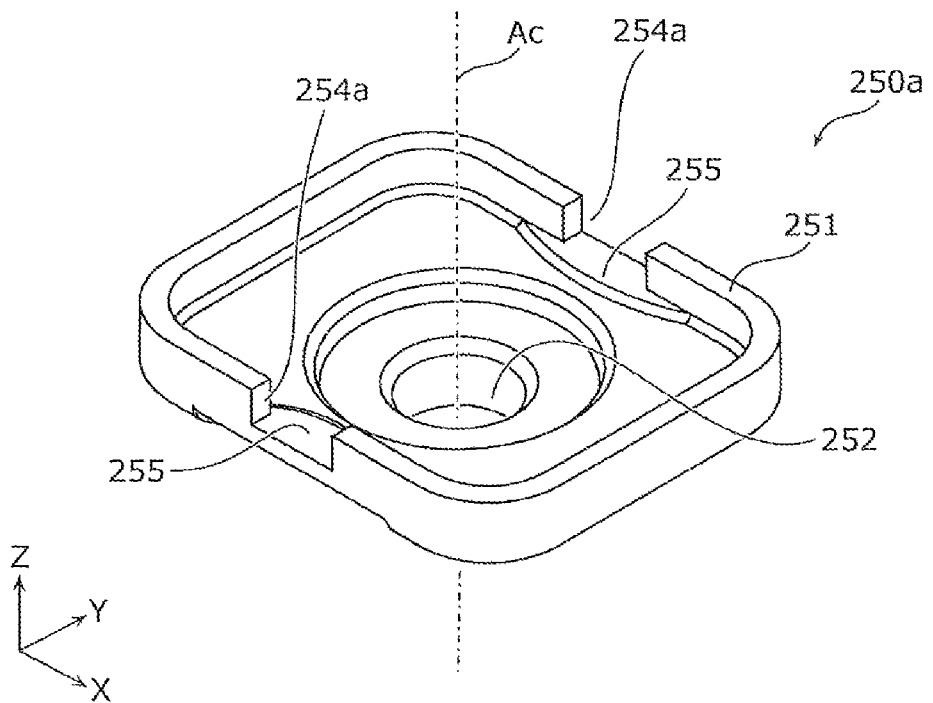
FIG. 7 is a perspective view illustrating the configuration of the upper insulating member according to a variation 1 of the embodiment.

FIG. 7 is a perspective view illustrating the configuration outline of an upper insulating member 250a according to the variation 1 of the embodiment. The upper insulating member 250a illustrated in FIG. 7 is a member disposed between the terminal body 201 and the case 100 in place of the upper insulating member 250 according to the above embodiment. The through-hole 252 through which the shaft portion 210 (See FIG. 3) penetrates is formed in the upper insulating member 250a according to the present variation, and the upper insulating member 250a has the sidewall portion 251 disposed along the end surface 202 (See FIG. 3) of the terminal body 201.

The configuration of them is common to the upper insulating member 250 according to the above embodiment. However, the sidewall portion 251 of the upper insulating member 250a according to the present variation is provided with a notch portion 254a at a position on the side of the center point P (center axis Ac in FIG. 7) of the shaft portion 210 in a direction (Y-axis direction in the present variation)

orthogonal to the extending direction (X-axis direction in the present variation) of the sidewall portion 251 in a plan view.

That is, in the upper insulating member 250a according to the present variation, in place of the thin portion 254, the notch portion 254a is provided at a position on the side of the center point P of the shaft portion 210 in the sidewall portion 251. This allows the upper insulating member 250a according to the present variation to give the same effect as the upper insulating member 250 according to the above embodiment.

Specifically, the upper insulating member 250a can easily accommodate the expansion portion (expansion portion 201a) of the terminal body 201 thanks to the notch portion 254a. That is, in the upper insulating member 250a according to the present variation, the notch portion (portion where the sidewall portion 251 does not exist) of the sidewall portion 251 is disposed at a position corresponding to the expansion portion 201a of the terminal body 201. Therefore, the upper insulating member 250a can appropriately hold any of the plurality of electrode terminals 200 in the case where the expansion amount d (see FIG. 4) of the terminal body 201 has individual differences among the electrode terminals 200. More specifically, at least a portion of the sidewall portion 251 without the notch portion 254a is disposed at a position along the end surface 202 of the terminal body 201, so that the sidewall portion can carry the function of a rotation stopper or position regulation of the electrode terminal 200 (terminal body 201). That is, the upper insulating member 250a according to the present variation can perform position regulation and the like of the terminal body 201 while allowing the lateral expansion of the shaft portion 210 of the terminal body 201. Accordingly, the energy storage device 10 including the upper insulating member 250a is the highly reliable energy storage device 10.

The notch portion 254a may be formed in an arc shape in a plan view. This allows a gap between the both end portions of the notch portion 254a in the sidewall portion 251 and the expansion portion 201a of the terminal body 201 to be reduced. As a result, the effectiveness of the rotation stopper or position regulation of the electrode terminal 200 (terminal body 201) by the sidewall portion 251 is improved.

(Variation 2)

Figure 8:
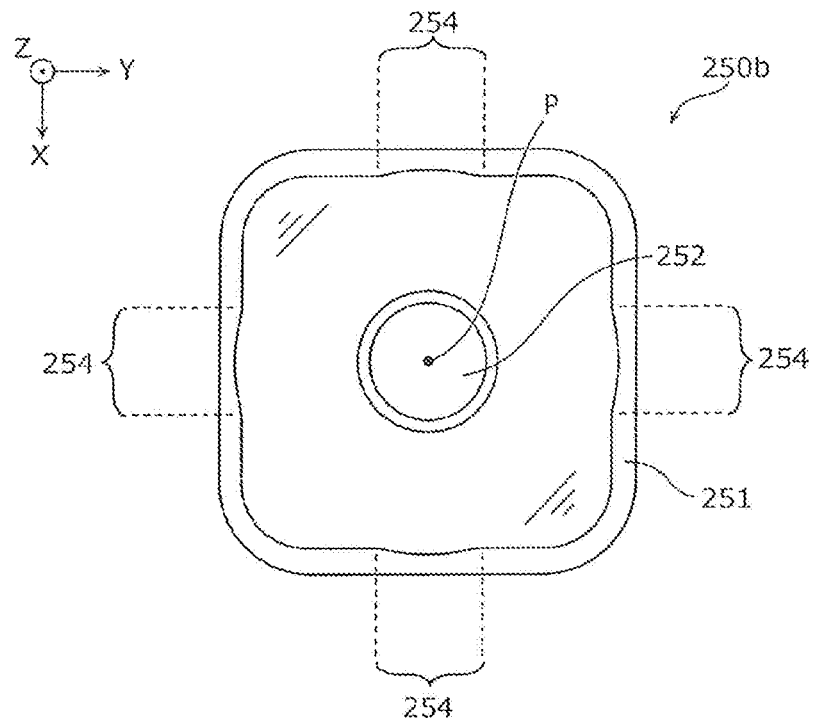
FIG. 8 is a plan view illustrating the configuration of the upper insulating member according to a variation 2 of the embodiment.
Figure 9:
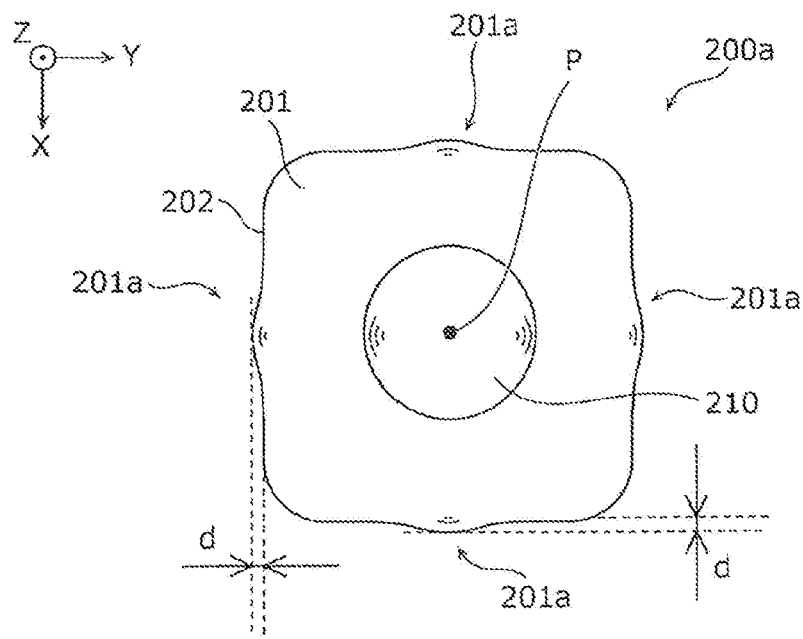
FIG. 9 is a plan view illustrating a configuration of an electrode terminal according to the variation 2 of the embodiment.

FIG. 8 is a plan view illustrating the configuration outline of an upper insulating member 250b according to a variation 2 of the embodiment, and FIG. 9 is a plan view illustrating the configuration outline of an electrode terminal 200a according to the variation 2 of the embodiment.

The upper insulating member 250b illustrated in FIG. 8 is a member disposed between the terminal body 201 and the case 100 in place of the upper insulating member 250 according to the above embodiment, and the electrode terminal 200a illustrated in FIG. 9 is a member disposed in place of the electrode terminal 200 according to the embodiment.

As illustrated in FIG. 9, the electrode terminal 200a according to the present variation has a rounded square shape in a plan view, and the distance from the center point P of the shaft portion 210 to each of the four sides is substantially the same. Therefore, the expansion portion 201a is formed on each of the four sides of the terminal body 201 in a plan view by the pressing force at the time of swaging joint between the shaft portion 210 and the terminal body 201.

The upper insulating member 250b, which holds the terminal body 201 of the electrode terminal 200a thus configured, is provided with four thin portions 254 corresponding to the four expansion portions 201a.

Specifically, in the upper insulating member 250b according to the present variation, the thin portion 254 is disposed at the positions opposed to each other in the first direction (Y-axis direction) of the upper insulating member 250b in a plan view, and is disposed at the positions opposed to each other in the second direction (X-axis direction) of the upper insulating member 250b in a plan view.

In this manner, even in the case where the expansion portions 201a occur on the four sides of the electrode terminal 200a provided with the shaft portion 210 at the center of the terminal body 201 having a substantially square shape in a plan view, the upper insulating member 250b can easily accommodate the expansion portion 201a of each side. That is, the highly reliable energy storage device 10 can be obtained even when the substantially square terminal body 201 is adopted to meet the specifications required for the energy storage device 10.

In the upper insulating member 250b, at least one of the four thin portions 254 may be replaced with the notch portion 254a. That is, when a plurality of expansion portions 201a are formed in the terminal body 201, the upper insulating member 250b may include the thin portion 254 or the notch portion 254a at respective positions corresponding to the plurality of expansion portions 201a. The expansion amount d of each of the plurality of expansion portions 201a formed in the terminal body 201 does not need to be uniform.

Other Embodiments

The energy storage device according to the present invention has been described on the basis of the embodiment and its variations. However, the present invention is not limited to the above embodiment and variations. Unless departing from the scope of the present invention, applications of various variations conceived by those skilled in the art to the above embodiment or variations or forms built by combining the plurality if components described above are included in the range of the present invention.

Similarly to the electrode terminal 200 on the negative electrode side, the electrode terminal 300 on the positive electrode side may be constituted by the terminal body and the shaft portion that are joined by swaging joint. In this case, by providing the thin portion or the notch portion in the sidewall portion of the upper insulating member 350, pressure on the sidewall portion by the expansion portion of the terminal body of the electrode terminal 300 is suppressed.

Specifically, in the electrode terminal 300 on the positive electrode side, both the terminal body and the shaft portion are preferably made of aluminum, aluminum alloy, or the like. Therefore, in general, the electrode terminal 300 is manufactured as a component in which the terminal body and the shaft portion are integrated by applying press working to an aluminum bar.

However, there is a case where a relatively large terminal body is needed in response to a request for an increase in the joint surface of the terminal body. In this case, when the terminal body is formed by applying press working to the bar, the portion to be deleted after the press working becomes relatively large, which is disadvantageous in terms of cost. Therefore, when a relatively large terminal body is needed, there is a case where the terminal body and the shaft portion are manufactured as separate components and subsequently the terminal body and the shaft portion are joined by swaging joint. That is, in this case, similarly to the electrode terminal 200 according to the above embodiment, an expansion portion is formed in the terminal body also in the electrode terminal 300 on the positive electrode side. Accordingly, by providing the upper insulating member 350 on the positive electrode side with a thin portion or a notch portion in the same manner as the upper insulating member 250 on the negative electrode side, the terminal body having the expansion portion can be held easily and reliably to such an extent that position regulation and the like are possible.

In the above embodiment, the thin portion 254 has a shape along the arc C (See FIG. 5), but the shape of the thin portion 254 in a plan view is not particularly limited. That is, the thin portion is only required to be provided in the sidewall portion 251 as a concave part opening to the terminal body 201 side in a plan view, and the shape of the concave part may be formed into either a curve or a straight line.

The joint between the terminal body 201 and the electrode terminal 200 may be performed after the terminal body 201 and the shaft portion 210 are disposed on the lid plate 110. The tip end portion of the shaft portion 210 may be swaged in a state where the shaft portion 210 fixed to the current collector 120 is inserted into the opening portion 282 of the lower insulating member 280, the opening portion 112 of the lid plate 110, the through-hole 252 of the upper insulating member 250, and the through-hole of the terminal body 201.

That is, the shaft portion 210 may be joined with the terminal body 201 by being swaged outside the case 100. In this case, no expansion occurs in the terminal body 201 at the time when the terminal body 201 is disposed on the upper insulating member 250, but the expansion portion 201a is formed on the side of the terminal body 201 by swaging the tip end portion of the shaft portion 210. At this time, the thin portion 254 or the notch portion 254a is disposed at a position opposite to the expansion portion 201a, i.e., a position on the side of the shaft portion 210 in the sidewall portion 251. This prevents the expansion portion 201a from pressing the sidewall portion 251 to an extent that it causes a defect such as whitening.

In the present embodiment, the energy storage device 10 includes only one electrode assembly 400, but the energy storage device 10 may include two or more of the electrode assemblies 400. If the energy storage device 10 includes two electrode assemblies 400, the current collector 120 may have four leg portions 122 joined with the two electrode assemblies 400.

The number of the leg portions 122 included in the current collector 120 is not limited to two. The current collector 120 may have at least one leg portion 122 joined with the negative-electrode-side end portion 421a of the electrode assembly 400.

The thicknesses of the plurality of thin portions included in the upper insulating member such as the upper insulating member 250 may be different from one another. The sizes of the plurality of notch portions included in the upper insulating member may be different. In the electrode terminal 200 according to the embodiment, it is assumed that the center point P of the shaft portion 210 is shifted from the center of the terminal body 201. In this case, the expansion amount d (See FIG. 4) of the expansion portion 201a at a position close to the center point P is considered to be larger than the expansion amount d of the expansion portion 201a at a position far from the center point P. In this case, in the upper insulating member 250, the thickness of the thin portion 254 corresponding to the expansion portion 201a at the position close to the center point P may be made thinner than the thickness of the thin portion 254 corresponding to the expansion portion 201a at the position far from the center point P. This allows the two expansion portions 201a to be easily accommodated in the insulating member 250 without excessively increasing the gap between each of the two expansion portions 201a having different expansion amounts d to each other and the thin portion 254.

Embodiments built by any combination of the configurations described in the above embodiment and variations are also included in the scope of the present invention.

The present invention can be not only realized as the above-described energy storage device but also realized as an energy storage apparatus including a plurality of energy storage devices.

INDUSTRIAL APPLICABILITY

The present invention is applicable to an energy storage device such as a lithium ion secondary battery.

DESCRIPTION OF REFERENCE SIGNS 10 energy storage device
100 case
200, 200a, 300 electrode terminal
201 terminal body
201a expansion portion
202 end surface
205 joint surface portion
210 shaft portion
250, 250a, 250b upper insulating member
251 sidewall portion
252 through-hole
253 bottom surface portion
254 thin portion
254a notch portion
255 convex part
256 concave part

The invention claimed is:

1. An energy storage device comprising:
a case;
an electrode terminal including a terminal body having a plate shape and a shaft portion connected to the terminal body, the terminal body having a rounded square shape in a plan view; and
an insulating member disposed between the terminal body and the case, the insulating member having a through-hole through which the shaft portion penetrates, wherein
the insulating member includes a sidewall portion disposed along an end surface of the terminal body,
the sidewall portion is provided with a thin portion or a notch portion, the thin portion or the notch portion being provided, in a plan view, at a position aligned with a center point of the shaft portion, the center point being positioned in a direction orthogonal to an extending direction of the side wall portion in the plan view,
an expansion portion is formed on each of four sides of the terminal body, and
one of the thin portion and the notch portion is disposed at a position corresponding to the expansion portion of the terminal body.

2. The energy storage device according to claim 1, wherein
the thin portion is formed along an arc centered at the shaft portion.

3. The energy storage device according to claim 1, wherein
in the plan view, the thin portion or the notch portion is disposed in the insulating member at positions opposed to each other in a first direction, and in the plan view, the thin portion or the notch portion is disposed in the insulating member at a center portion in a second direction orthogonal to the first direction.

4. The energy storage device according to claim 1, wherein
in the plan view, the thin portion or the notch portion is disposed in the insulating member at positions opposed to each other in a first direction, and
in the plan view, the thin portion or the notch portion is disposed in the insulating member at positions opposed to each other in a second direction orthogonal to the first direction.

5. The energy storage device according to claim 1, wherein
in the plan view, the terminal body includes, on each side of the shaft portion, a joint surface portion to which an external conductive member is joined.

6. An energy storage device comprising:
a case;
an electrode terminal including a terminal body having a plate shape and a shaft portion connected to the terminal body, the terminal body having a rounded rectangular shape in a plan view;and
an insulating member disposed between the terminal body and the case, the insulating member having a through-hole through which the shaft portion penetrates, wherein
the insulating member includes a sidewall portion disposed along an end surface of the terminal body, the end surface including two sides extending in a one direction and two sides extending in an other direction orthogonal to the one direction, the two sides extending in the other direction being longer than the two sides extending in the one direction,
the sidewall portion is provided with a thin portion or a notch portion, the thin portion or the notch portion being provided, in a plan view, at a position aligned with a center point of the shaft portion, the center point being positioned in a direction orthogonal to an extending direction of the side wall portion in the plan view,
the center point is aligned at a center of the sides of the end surface extending in the one direction and at a center of the sides of the end surface extending in the other direction,
an expansion portion is formed on each of the four sides of the terminal body, and
one of the thin portion and the notch portion is disposed at a position corresponding to the expansion portion of the terminal body.

7. The energy storage device according to claim 6, wherein
the thin portion is formed along an arc centered at the shaft portion.

8. The energy storage device according to claim 6, wherein
in the plan view, the thin portion or the notch portion is disposed in the insulating member at positions opposed to each other in a first direction, and
in the plan view, the thin portion or the notch portion is disposed in the insulating member at a center portion in a second direction orthogonal to the first direction.

9. An energy storage device comprising:
a case;
an electrode terminal including a terminal body and a shaft portion connected to the terminal body, the terminal body having a rounded rectangular shape or a rounded square shape in a plan view; and
an insulating member disposed between the terminal body and the case, the insulating member having a through-hole through which the shaft portion penetrates, wherein
the insulating member includes a sidewall portion disposed along an end surface of the terminal body,
the sidewall portion is provided with a thin portion or a notch portion, the thin portion or the notch portion being provided, in a plan view, at a position aligned with a center point of the shaft portion, the center point being positioned in a direction orthogonal to an extending direction of the side wall portion in the plan view,
an expansion portion is formed on each of four sides of the terminal body, and
one of the thin portion and the notch portion is disposed at a position corresponding to the expansion portion of the terminal body.

10. The energy storage device according to claim 9, wherein
the end surface includes two sides extending in a one direction and two sides extending in an other direction orthogonal to the one direction, the two sides extending in the other direction being longer than the two sides extending in the one direction, and
the center point is aligned at a center of the sides of the end surface extending in the one direction and at a center of the sides of he end surface extending in the other direction.

\* \* \* \* \*